US011431170B1

(12) United States Patent
Guo et al.

(10) Patent No.: US 11,431,170 B1
(45) Date of Patent: Aug. 30, 2022

(54) BESS AIDED RENEWABLE ENERGY SUPPLY USING DEEP REINFORCEMENT LEARNING FOR 5G AND BEYOND

(71) Applicant: Deke Guo, Hunan (CN)

(72) Inventors: Deke Guo, Hunan (CN); Lailong Luo, Hunan (CN); Hao Yuan, Hunan (CN); Guoming Tang, Hunan (CN); Long Zheng, Hunan (CN); Yahui Wu, Hunan (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 17/370,644

(22) Filed: Jul. 8, 2021

(51) Int. Cl.
  *H02J 3/00* (2006.01)
  *H02J 3/32* (2006.01)
  *G06N 3/04* (2006.01)

(52) U.S. Cl.
  CPC ............... *H02J 3/004* (2020.01); *G06N 3/04* (2013.01); *H02J 3/32* (2013.01); *H02J 2300/24* (2020.01); *H02J 2300/28* (2020.01)

(58) Field of Classification Search
  CPC .................................................. H02J 3/004
  See application file for complete search history.

(56) References Cited

U.S. PATENT DOCUMENTS

| 2014/0244188 | A1* | 8/2014 | Bai ..................... F03D 17/00 |
| | | | 702/60 |
| 2016/0190984 | A1* | 6/2016 | Caine ................... H02S 50/10 |
| | | | 702/60 |
| 2017/0045902 | A1* | 2/2017 | Patil .................... G05B 13/048 |
| 2021/0003974 | A1* | 1/2021 | Yang ................... G05B 13/048 |
| 2021/0255251 | A1* | 8/2021 | Ukumori ............. G01R 31/392 |
| 2021/0326695 | A1* | 10/2021 | Vitebsky ............... H04W 24/08 |

OTHER PUBLICATIONS

Liyuan Zhoa, Reinforcement learning in sustainable energy and electric systems: a survey, 2020, Annual Reviews in Control, vol. 49, pp. 145-163 (Year: 2020).*

(Continued)

*Primary Examiner* — Nathan L Laughlin
(74) *Attorney, Agent, or Firm* — Dragon Sun Law Firm, PC; Jinggao Li, Esq.; Nathaniel Perkins

(57) ABSTRACT

A battery energy storage system (BESS) including: a battery storage configured to store surplus renewable energy; a controller coupled to the battery storage and configured to control charging operations and discharging operations of the battery storage; a generation meter coupled to the controller and configured to measure renewable energy; a renewable energy generator coupled to the generation meter and configured to generate renewable energy; and a standard meter coupled to the controller and configured to measure energy provided by a power grid; wherein the controller is configured to manage energy expenditure of the BESS according to the following steps: initializing a replay buffer configured to store state transition samples; initializing a main net configured to generate a current Q-value; initializing a target net configured to generate a target Q-value; obtaining an environment state of the BESS; and selecting an action based on an $\epsilon$-greedy policy.

13 Claims, 19 Drawing Sheets

(56) References Cited

OTHER PUBLICATIONS

Erick Arwa, Reinforcement Learning Techniques for Optimal Power Control in Grid-Connected Microgrids:A Comprehensive Review , Nov. 2020 (Year: 2020).*

Yuankun Liu, Optimization Strategy Based on Deep Reinforcement Learning for Home Energy Management, pp. 572-581, CSEE Journal of Power and Energy Systems, vol. 6 No. 3, Sep. 2020 (Year: 2020).*

\* cited by examiner (a) Power demand pattern of BSs at resident area.

(b) Power demand pattern of BSs at office area.

(c) Power demand pattern of BSs at comprehensive area.

(a) The power supply pattern under the clear & high-wind day.

(b) The power supply pattern under the clear & middle-wind day (c) The power supply pattern under the clear & low-wind day (d) The power supply pattern under the partial cloudy & high-wind day (e) The power supply pattern under the partial cloudy & middle-wind day (f) The power supply pattern under the partial cloudy & low-wind day (h) The power supply pattern under the cloudy & middle-wind day (i) The power supply pattern under the cloudy & low-wind day

BESS AIDED RENEWABLE ENERGY SUPPLY USING DEEP REINFORCEMENT LEARNING FOR 5G AND BEYOND

TECHNICAL FIELD

The present disclosure relates to the field of cellular networking, and more particularly relates to a battery energy storage system (BESS) for managing energy expenditure in networking base stations.

BACKGROUND

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference is individually incorporated by reference. In terms of notation, hereinafter, [n] represents the nth reference cited in the reference list.

Modern innovations have resulted in an unprecedented development of 5G networks, along with the widespread deployment of 5G base stations (BSs). Compared to 4G/LTE, 5G may provide much higher bandwidth, lower and more reliable latency, and larger number of connections many IoT devices. Nevertheless, the enormous energy consumption of BSs and related costs have become significant concerns for mobile operators. As the price of renewable energy has continuously declined, equipping BSs with renewable energy generators may be a promising solution for energy cost reduction.

5G is considered to be a promising technology for significantly improving the daily life of many individuals [1]. Compared to 4G/LTE, 5G can ensure users receive higher bandwidth and lower latency, enabling various cutting-edge mobile services, such as the Internet of Vehicles [2], Virtual Reality [3], and Smart Medical Home [4].

Building and operating such large-scale BSs requires an enormous investment and may consume many resources (e.g., power consumption). According to field surveys in the cities of Guangzhou and Shenzhen, China, the full-load power consumption of a typical 5G BS is about 2-3 times of that of a 4G BS [5]. Considering the ultra-dense deployment of 5G BSs, a tenfold increase in energy consumption may be realized. As such, reducing energy consumption in 5G BSs may result in significant resource consumption reduction.

Renewable energies such as solar energy and wind energy may be environmentally-friendly means for supplying power with low CO2 emissions. Due to a continuing price decline in photovoltaic (PV) modules and wind turbines, the installation cost of renewable energy has dramatically decreased over the past decade, (e.g., there has been a 61% reduction of the solar equipment from 2010 to 2017) [8]. Such cost reductions can lead to a rapid payback period for the initial renewable energy investment, from a couple of years to several months [9]. The above observations indicate a great potential for renewable energy on the market as fossil fuel replacement in the reduction of carbon emissions.

It thus has inspired the mobile operators to utilize renewable energy as an auxiliary power supply to tackle the huge power demand at 5G BSs. In some developing countries, solar power has already been applied to supply the BSs, some of which occupies at least 8% of the total electricity usage [10]. By installing the PV and wind turbine near the BSs, it shows that the maximum power generations from the solar and wind generators can reach up to 8.5 kW and 6.0 kW, respectively [10], which can remarkably cut down the communication energy supply from the traditional power gird.

Therefore, a heretofore unaddressed need exists in the art to address the aforementioned deficiencies and inadequacies.

SUMMARY

In the present disclosure, a battery energy storage system (BESS) aided renewable energy supply solution is described Aiming to reduce energy costs for mobile operators, the BESS may maximize the utilization of renewable energy and thus minimize the utilization of the power grid (i.e., fossil energy). Specifically, the energy charge can be continuously reduced using generated renewable power, and the demand charge can be reshaped and flattened through strategic battery discharging/charging operations.

Due to the adoption of high frequency bands by 5G base station (BS), its signal coverage range is much shorter than that of the 4G/LTE. Consequently, the mobile operators need to deploy a large number of 5G BSs to counteract poor signal coverage. This would result in an ultra-dense BS deployment, especially in "hotspot" areas, as illustrated in FIG. 1.

In order to minimize the electricity cost of 5G BSs, the BESS may be a renewable energy supply solution for BSs, which can supply clean energy to the BS and store surplus energy for backup usage. Specifically, a deep reinforcement learning (DRL) based storage controlling policy may be used to better control batter charging/discharging, which can adapt to the dynamical renewable energy generations as well as varying power demands. Using real-world data on renewable energy generations and power demands demonstrate that, the proposed solution can result in a monthly saving for one BS by up to $50.7 (with a corresponding saving ratio of 74.8%), compared to when using only a power grid supply.

To maximize the utilization of renewable energy, energy storage can be strategically utilized such that the energy can be continuously provided, as renewable (e.g., solar, wind, etc.) energy is intermittent and unstable. Meanwhile, most BSs are equipped with backup batteries to safeguard the BS's normal functioning against power outages, providing for natural energy storage. With the continuous price decline in battery storage in recent years [11, 12], combining battery storage with renewable energy generators could offer even greater cost-reduction potential. Specifically, i) when the generated renewable power is less than the power demand (e.g., during the peak hours), the battery can be discharged to flatten the peak power demands, and ii) when the generated renewable power is more than the power demand (e.g., during the off-peak hours), the battery can be charged to store the surplus renewable energy.

When designing the optimal control strategy in battery discharging/charging operations, several challenges must be addressed. First, renewable energy generation and power demands vary highly in both spatial and temporal dimensions and thus may be difficult to predict. Second, due to the physical constraints of battery discharging/charging operations (e.g., discharge/charge efficiency), it may be complicated to design an optimal battery controlling policy. Third, as the battery's capacity and lifetime are limited and shortened along with the discharge/charge cycles, it is necessary to trade-off between the cost of battery's degradation/replacement and the gain of renewable energy storage.

The BESS aided renewable energy supply paradigm for 5G BS operations, in which the battery discharging/charging controlling is modelled as an optimization problem is described herein. The model takes into account practical considerations of dynamic power demand and renewable energy generation, as well as battery specifications and physical constraints.

To cope with dynamic renewable energy generation and power demands, while maintaining a reasonable computation complexity for the optimization problem, a deep reinforcement learning (DRL) based battery discharging/charging controlling policy may be used which can improve its decision-making process by interacting with the environment.

Extensive evaluations are conducted using real-world BS deployment scenarios and BS traffic load traces. The results show that the proposed DRL-based battery discharging/charging controlling policy can effectively utilize the renewable energy and cut down the energy cost, with the cost saving up to 550.7.

In one embodiment, A battery energy storage system (BESS) is described. The BESS includes: a battery storage configured to store surplus renewable energy; a controller coupled to the battery storage and configured to control charging operations and discharging operations of the battery storage; a generation meter coupled to the controller and configured to measure renewable energy; a renewable energy generator coupled to the generation meter and configured to generate renewable energy; and a standard meter coupled to the controller and configured to measure energy provided by a power grid; wherein the controller is configured to manage energy expenditure of the BESS according to the following steps: initializing a replay buffer configured to store state transition samples; initializing a main net configured to generate a current Q-value; initializing a target net configured to generate a target Q-value; obtaining an environment state of the BESS; selecting an action based on an $\epsilon$-greedy policy, wherein the action controls battery discharging and battery charging operations of the BESS; executing the action resulting in a next environment state and calculating a reward based on the performance of the action; storing transition samples in the replay buffer, the transition samples comprising the environment state, the action, the reward, and the next environment state; periodically updating a Deep Neural Network (DNN) by a loss function with a mini-batch experience from the replay buffer; updating the target net based on the reward; and periodically updating parameters of the target net with parameters of the main net, wherein the DNN comprises the main net and the target net.

In another embodiment, the reward is calculated based on a reward function and the reward function comprises a reward for incremental energy charge, a reward for incremental demand charge, and a reward for an investment cost.

In another embodiment, the incremental energy charge comprises a total consumed electricity amount of the BESS in one cycle.

In another embodiment, the incremental demand charge comprises a peak power demand of the BESS in one cycle.

In another embodiment, the investment cost comprises a cost of using the battery storage and the renewable energy generator in one cycle.

In another embodiment, the loss function comprises an expected value of the difference between the target Q value and the current Q value.

In another embodiment, the $\epsilon$-greedy policy includes: selecting an action with a maximum reward from the main net with a probability of $\epsilon$; and selecting a random action with a probability of 1-$\epsilon$.

In another embodiment, the DNN is updated by the loss function with a mini-batch experience from the replay buffer by means of stochastic gradient descent.

In another embodiment, the environment state includes: a power demand of the BESS; an amount of renewable energy generated by the renewable energy generator; a battery storage state; and a peak power consumption of the BESS.

In another embodiment, the battery storage state includes: a State of Energy (SoE) including a current effective capacity of the battery storage as a percentage of an initial capacity of the battery storage; a State of Charge (SoC) including a current energy stored in the battery as a percentage of the current effective capacity; and a Depth of Discharge (DoD) including an amount of energy that has been released by the battery storage as a percentage of the current effective capacity.

In another embodiment, parameters of the main network are updated in real time based on results from the loss function.

In another embodiment, the renewable energy generator comprises a solar photovoltaic (PV) module and a wind turbine.

In another embodiment, the power generated by the solar PV module is calculated based on global horizontal irradiance, outdoor temperature, and time of day.

In another embodiment, the power generated by the wind turbine is calculated based on wind velocity, a weather system, and hub height.

In another embodiment, the action comprises (i) a determination of whether or not the battery storage should be discharged or charged and (ii) a determination of an amount of energy to be discharged or charged.

BRIEF DESCRIPTION OF THE DRAWINGS

The accompanying drawings illustrate one or more embodiments of the present disclosure and, together with the written description, serve to explain the principles of the present disclosure, wherein:

FIGS. 2A-2C illustrates graphs showing power demand patterns for BSs, wherein FIG. 2A shows a power demand pattern of BSs in a residential area, FIG. 2B shows a power demand pattern of BSs in an office area, and FIG. 2C shows a power demand pattern of BSs in a comprehensive area, in accordance with an embodiment of the present disclosure;

FIGS. 6A-6B illustrate graphs showing output power patterns for different weather conditions, wherein FIG. 6A shows solar photovoltaic (PV) output power patterns and FIG. 6B shows wind turbine output power patterns, in accordance with an embodiment of the present disclosure;

DETAILED DESCRIPTION

Figure 1:
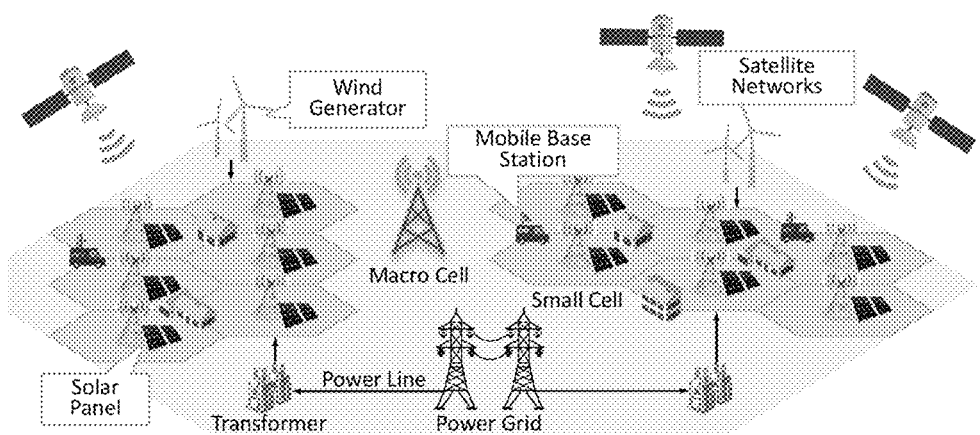
FIG. 1 illustrates a system of network base stations integrated with power solutions, in accordance with an embodiment of the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

Embodiments of the present disclosure are illustrated in detail hereinafter with reference to accompanying drawings. It should be understood that specific embodiments described herein are merely intended to explain the present disclosure, but not intended to limit the present disclosure.

In order to further elaborate the technical means adopted by the present disclosure and its effect, the technical scheme of the present disclosure is further illustrated in connection with the drawings and through specific mode of execution, but the present disclosure is not limited to the scope of the implementation examples.

The present disclosure relates to the field of cellular networking, and more particularly relates to a battery energy storage system (BESS) for managing energy expenditure in networking base stations.

Base Station Power Demand

Figure 2A:
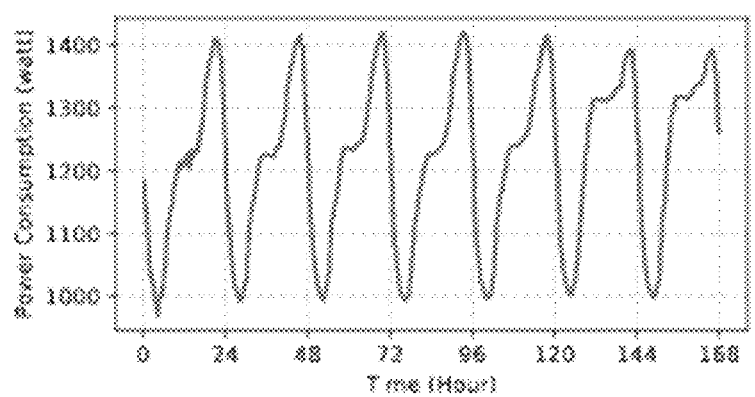
Figure 2B:
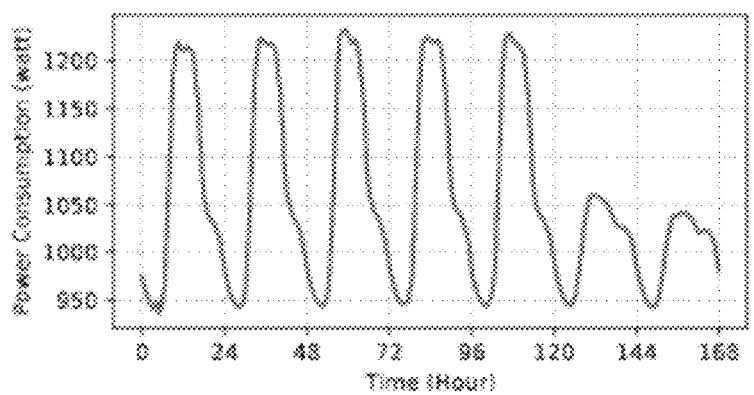
Figure 2C:
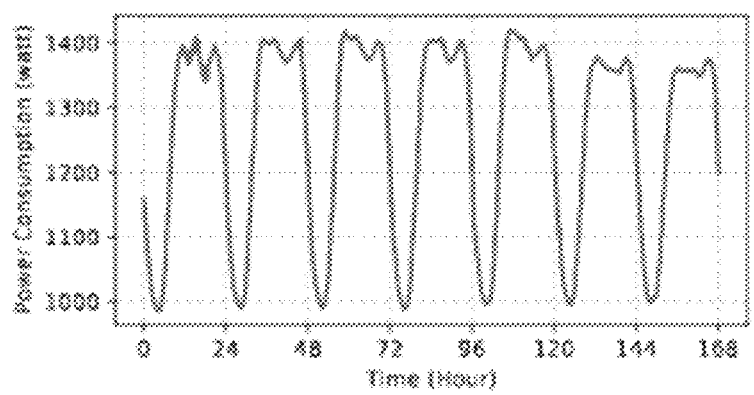

The power demand pattern of a BS is mainly determined by its location and the behavior of users at the location. Usually, the demand also shows a periodic pattern (e.g., with a one-day or one-week period). As shown in FIGS. 2A-2C, three types of BSs are considered at resident, office, and comprehensive areas, which account for nearly ninety percent of total demands [13]. The characteristics of these power demand patterns are as follows.

Power Demand of BSs at Resident Area: the power demands of this type of BS increases rapidly in the evening, as most people stay at home after work. Compared with weekdays, the power demands are typically at high levels on weekends.

Power Demand of BSs at Office Area: the power demands of this type of BS is at a high-level during the day, while people are working. However, as fewer people work on weekends, the weekend power demands are much lower than those during the week.

Power Demand of BSs at Comprehensive Area: due to the diversity of the requests, compared to the above two BSs, the power demand patterns of this type of BS is more stable: constantly keep at a high-level in the day time and evening and drop in the late night and early morning.

The first two types of power demand patterns change relatively dramatically, leading to a huge energy-saving potential, especially for demand charge, to be discussed below.

Energy Cost of 5G BS

The energy cost of the mobile operator typically makes up of two components: i) energy charge (i.e., the total consumed electricity amount (in kWh) throughout the entire billing cycle (e.g., one month)), and ii) demand charge (i.e., the peak power demand (in kW) during the billing cycle period). Specifically, the demand charge is regarded as a penalty caused by an extra load burden to the power grid.

For example, for a commercial data center consuming 10 MW on peak and 6 MW on average, the monthly energy charge and demand charge amounts to around $24,000 and $165,500, respectively [14]. The demand charge can be up to 8 times the energy charge. As such, effectively cutting down the demand charge could remarkably reduce the energy cost. However, there seems no practical way to flatten the peak power demands of 5G BSs, e.g., shifting real-time demands from mobile users to the off-peak hours could lead to a long delay for some classes of jobs [15].

System Model

For clarity, major notations used in the present disclosure are shown in Table I.

TABLE I

| Notation | Description |
| --- | --- |
| d(t) | power demand of 5G BS in time slot t |
| g(t) | renewale energy generation in time slot t |
| b(t) | battery discharging/charging operations in time slot t |
| χ(t) | battery state in time slot t |
| p(t) | power supplied by the power gird in time slot t |
| $p_{max}$ | peak power consumption supplied by power gird |
| π | initital capacity of the battery |
| $C^e(t)$ | energy charge of 5G BS in time slot t |
| $C^d(t)$ | demand charge of 5G BS in time slot t |
| $C^u(t)$ | investment cost in time slot t |
| $\lambda_e$ | prices of energy charge |
| $\lambda_d$ | prices of demand charge |
| $\lambda_u$ | prices of investment cost |
| α, β | discharging and charging efficiencies, respectively |
| R+, R− | max charge and discharge ares of battery, respectively |
| s(t) | environment state in time slot t |
| a(t) | action taken by the agent in time slot t |
| r(t) | reward of the action in time slot t |
| ψ | mapping policy from environment states to action |
| R(a(t), s(t)) | reward function of the DQN |
| Q, $\overline{Q}$ | Q-values of the main net and target net, respectively |
| θ, $\overline{\theta}$ | parameters of the main net and target net, respectively |

Scenario Overview

Figure 3:
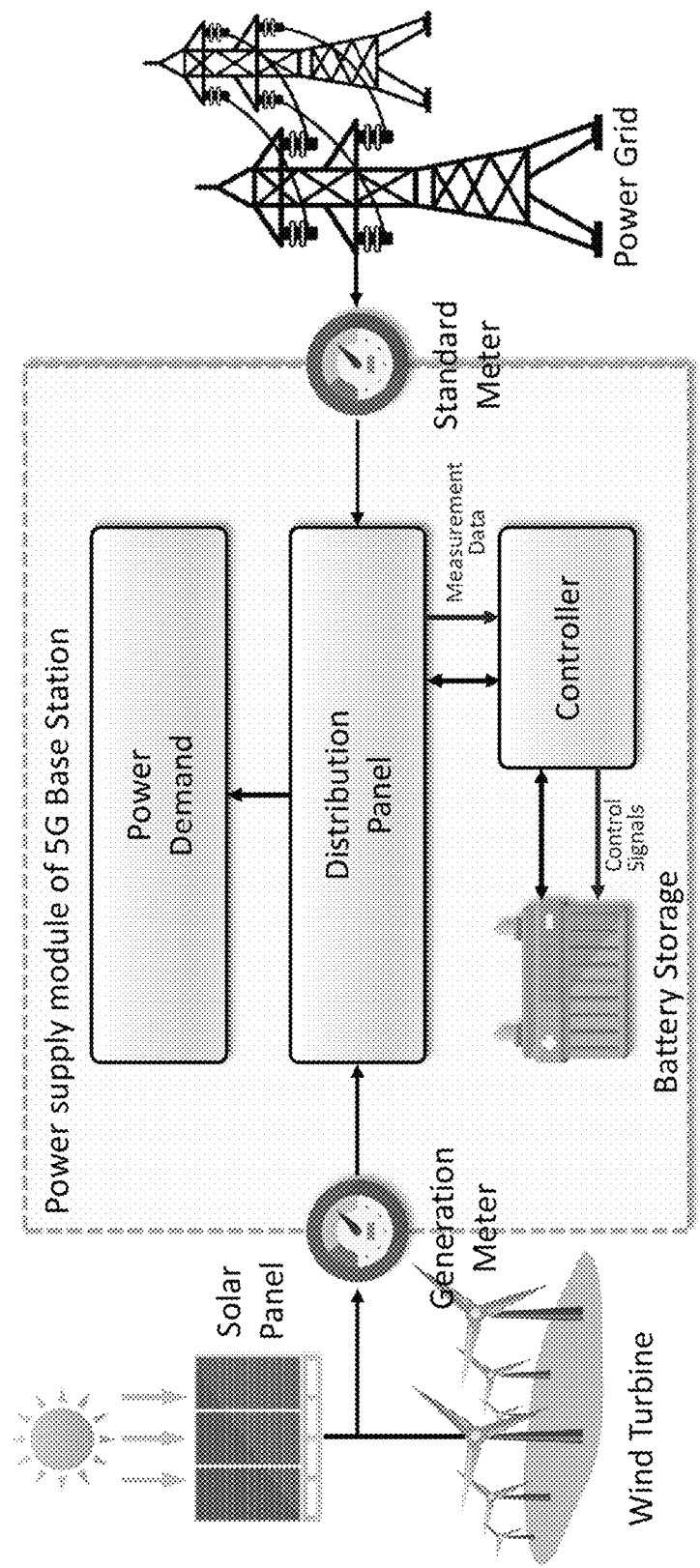
FIG. 3 illustrates an exemplary BESS, in accordance with an embodiment of the present disclosure.

As illustrated in FIG. 3, the proposed BESS aided renewable energy supply solution deployed at each 5G BS mainly includes: i) a renewable energy generator, (e.g. a PV panel and wind turbine), which is deployed near the 5G BS system and generates renewable energy for the system, ii) a battery storage, which stores the surplus renewable energy and acts as the power source for the BS as needed, and iii) a controller, which can obtain the environment state (i.e., the measurement data) so as to control the battery discharging/charging operations through the control signals. In addition to the standard meter, as shown in FIG. 3, an additional generation meter is installed for the BS power supply system to measure the renewable energy generation. Furthermore, with commands from the controller, the distribution panel takes responsibility of switching power between renewable energy and grid energy and ensures continuous and stable electricity supply for the BS.

As the essential component of the BESS aided renewable energy supply solution, the controller determines how efficient this paradigm is. Specifically, at each scheduling point, the controller needs to decide the amount of power to be supplied from either the battery or the power grid. The scheduling operations should be made upon the power demands and battery states in real-time, so that the utilization of renewable energy can be enhanced and the total energy cost can be minimized.

BS Power Supply and Demand

The power of each 5G BS is supplied by three parts: power grid, generated renewable energy, and storage energy. In particular, i) when generated renewable energy is greater than the power demand (e.g., during the off-peak hours), each 5G BS is only supplied by renewable energy (i.e., off-grid) and the surplus renewable energy is stored in battery storage, ii) when generated renewable energy is less than the power demand (e.g., during the peak hours), each 5G BS is supplied by all three parts cooperatively.

A discrete time model is described, where the entire billing cycle (e.g., one month) is equally split into T consecutive slots with length $\Delta t$ of and denoted by $\mathcal{T} = \{1, 2, \ldots, T\}$. For an arbitrary 5G BS, the power demand during the entire billing cycle can be represented by a power demand vector:

$$d := [d(1), d(2), \ldots, d(T)]$$

where $d(t)$ is the power demand in time slot t, which can be obtained by power meter readings at each BS.

Renewable Energy Generation

By harvesting energy from renewable energy resources, the BSs could be powered in an environmentally friendly and cost-efficient way. In order to make the model extensible, the renewable energy generation vector may be denoted as:

$$g := [g(1), g(2), \ldots, g(T)]$$

Two typical renewable energy sources are chosen as auxiliary power sources, i.e., solar energy ($g^s(t)$) and wind energy ($g^w(t)$). Accordingly, for an arbitrary time slot t, the renewable energy generation vector can be represented by:

$$g(t) = g^s(t) + g^w(t)$$

It may be assumed that if the total generated renewable energy is beyond the power demand (i.e., $g(t) > d(t)$), the power is supplied in proportion to the renewable energy generated. The generation of both sources varies during a certain period (e.g., one day) and is affected by factors such as weather, temperature, wind speed, etc.

Solar Energy Generation

Power generated by the solar PV system mainly depends on three factors: global horizontal irradiance (GHI(t)), outdoor temperature (Temp(t)), and time of day (ToD(t)). Specifically, multiple solar PV cells are connected in series/parallel to absorb sunlight and convert the naturally available plenty of solar energy into DC to charge the battery storage and supply the power demand. The generated power by the solar PV at time slot t can be measured by the following function:

$$g^s(t) = \mathbb{F}^S(\text{GHI}(t), \text{Temp}(t), \text{ToD}(t))$$

where $\mathbb{F}^S(\bullet)$ is a known, non-linear function defined in PVLIB [17]. Accordingly, the solar energy generation during the entire billing cycle can be represented by a vector:

$$g^s := [g^s(1), g^s(2), \ldots, g^s(T)]$$

Wind Energy Generation

Power generated by the wind turbine generator fluctuates randomly with time and mainly depends on the wind velocity (WV(t)), weather system (WS(t)), and hub height (HH(t)). The energy generated by the wind turbine typically is divided into two stages: first, it converts the wind power into mechanical energy and then transforms into electricity. The amount of the power generated by the wind turbine at time slot t can be calculated by the following function:

$$g^w(t) = \mathbb{F}^W(\text{WV}(t), \text{WS}(t), \text{HH}(t))$$

where $\mathbb{F}^W(\bullet)$ is a known, non-linear function defined in [18]. Accordingly, the wind energy generation during the entire billing cycle can be represented by a vector:

$$g^w := [g^w(1), g^w(2), \ldots, g^w(T)]$$

Battery Specification

At an arbitrary time slot t, the state of the battery is modeled as follows:

$$\chi(t) := \rangle \text{SoE}(t), \text{SoC}(t), \text{DoD}(t) \rangle$$

where the notations of State of Energy (SoE), State of Charge (SoC), and Depth of Discharge (DoD) represent the state of effective capacity state of charge, and depth of discharge of the battery, respectively. Specifically, i) SoE indicates the current effective capacity of the battery, as a percentage of its initial capacity (denoted as $\pi$), ii) SoC indicates the current energy stored in the battery, as a percentage of the current effective capacity, and iii) DoD indicates how much energy the battery has released, as a percentage of the current effective capacity.

For simplicity, the SoC of a battery may be discretized into M equal-spaced states (e.g., M=10, i.e., 10%, 20%, ..., 100%}). Accordingly, the DoD is also discretized (e.g., release 10% from 90%, i.e., 90% to 80%). For an arbitrary time slot t, in order to prevent the battery from over-discharging/charging, $\text{SoC}_{max}$ and $\text{SoC}_{min}$ may be used to indicate the upper and lower bounds of SoCs, respectively, which is shown as follows.

$$\text{SoC}_{min} \leq \text{SoC}(t) \leq \text{SoC}_{max}$$

BESS Aided Renewable Energy Supply

The battery storage is deployed at 5G BSs, and can be charged using surplus renewable energy (generated by solar PV and wind turbine system) and discharged to reshape power demand to maximize the utilization of renewable energy (or minimize the utilization of fossil fuel) and reduce electricity expenditure.

The battery discharging/charging operations may be defined by a battery operation vector:

$$b := [b(1), b(2), \ldots, b(T)]$$

where $b(t)$ is a real number variable and indicates the amount of discharging/charging operations. In detail, i) a positive value indicates discharging the power from the battery storage to the 5G BS during time slot t, ii) a negative value indicates charging from the renewable energy to the battery storage, and iii) a zero value indicates no discharging/charging operation performs.

Meanwhile, the discharging/charging operations are constrained by the maximum charging rate and maximum discharging rate, denoted as $R^+$ and $R^-$, respectively. The largest power that the battery can be recharged and supplied within a time slot is shown as follows.

$$-R^+ \leq b_n(t) \leq R^-$$

The battery storage needed to meet the following conditions in discharging/charging operations may be described as:

$$b(t) \leq 0, \text{if } g(t) - d(t) \geq 0$$

$$b(t) > 0, \text{if } g(t) - d(t) < 0$$

which shows that the battery storage can only be charged when there exists surplus renewable energy after supplying to the 5G BS, and means that the battery storage cannot be simultaneously charged and discharged at any time slot.

Due to power loss (e.g., AC-DC conversion and battery leakage [19]) that occurred during discharge from battery storage to the power grid (or charge from renewable energy to the battery storage), the actual discharging/charging operations from/to the battery by may be defined by:

$$\tilde{b}(t) = \begin{cases} b(t)/\alpha, & \text{if } b(t) \leq 0 \\ \beta \cdot b(t), & \text{if } b(t) > 0 \end{cases}$$

Given the power demand of the 5G BS (i.e., d(t)), the renewable energy generation (i.e., g(t)), and the battery discharging/charging operations (i.e., b(t)), the power consumption vector supplied by the power grid can be derived for an arbitrary time slot t by:

$$p:=[p(1), p(2), \ldots, p(T)]$$

where p(t) is denoted as:

$$p(t) = \begin{cases} \max\{0, d(t) - g(t) - \tilde{b}(t)\}, & \text{if discharging} \\ \max\{0, d(t) - g(t)\}, & \text{if charging} \end{cases}$$

Energy Cost

The billing policy of energy cost for mobile operators throughout the entire billing cycle typically includes two components, energy charge and demand charge. As described below:

Energy Charge is the total consumed electricity amount (in kWh) throughout the entire billing cycle (denoted by $\lambda_e$).

Demand Charge is the peak power consumption supplied by power gird (in kW) during the entire billing cycle (denoted by $\lambda_d$).

Therefore, the incurred cost of energy charge of the whole system in each time slot t can be represented by:

$$C^e(t) = \lambda_e \cdot p(t) \cdot \Delta t$$

The incurred cost of demand charge of the whole system in each time slot t can be represented by:

$$C^d(t) = \lambda_d \cdot \max\{0, p(t) - p_{max}\}$$

where $p_{max}$ records the peak power consumption during the past t−1 time slots. For any arbitrary time slot t, if $p(t) - p_{max} > 0$, $p_{max}$ will be updated to p(t) accordingly.

Investment Cost

Every usage of the aforementioned equipment (solar PV, wind turbine, and battery storage) incurs a certain reduction of its lifetime. For an investor, this presents a considerable quandary associated with financial risk. Therefore, it is important to understand, detail and quantify the various factors influencing performance loss curves. For accuracy, the investment cost in every time slot will be further described below.

Renewable Energy Generator Cost

As modules of a renewable energy generated system age, they gradually lose some performance. In this paper, it may be assumed that the decline of the system is linear and positively related to usage time. The lifetime of the renewable energy generator is denoted as L, which indicates the total time the renewable energy generator can be used. For an arbitrary time slot t, the remaining lifetime of the renewable energy generator is denoted as l(t), which is constrained by $0 \leq l(t) \leq L$. The renewable energy generator must be discarded and replaced by a new one if $l(t) \leq 0$. Given the remaining lifetime of the renewable energy generator at time t−1, the remaining lifetime at time t is updated by:

$$l(t) = l(t-1) - \Delta t \cdot u(t)$$

where u(t) is defined by:

$$u(t) = \begin{cases} 1, & \text{if using} \\ 0, & \text{if not using} \end{cases}$$

The usage cost of the renewable energy generator in each time slot t is denoted as:

$$C^u(t) = \lambda \cdot \frac{\Delta t \cdot u(t)}{L}$$

where $\lambda$ is the investment cost of a new renewable energy generator.

The model of renewable energy generator may be applied to specific system, i.e., the solar PV system and wind turbine system. In detail, i) for the solar PV system, the lifetime, the investment cost, and investment are denoted as $l^s(t)$, $C^{u_s}(t)$, and $\lambda_s$ respectively, ii) for the wind turbine system, the lifetime, the using cost, and investment are denoted as $l^w(t)$, $C^{u_w}(t)$, and $\lambda_w$, respectively. Accordingly, the usage cost of the solar PV system and wind turbine system can be derived by replacing the lifetime, investment cost, and investment symbols in the usage cost formula described above.

Battery Storage Degradation Cost

Every cycle of the discharge/charge operations inflicts some "harm" on the battery (typically lead-acid) and reduces its capacity and lifetime. In particular, a deep discharging can severely affect the internal structure of the battery, and may even result in permanently damage (e.g., an over-discharging). The battery must be discarded and replaced by a new one when the effective capacity drops down to an "ineffective" level, denoted by $SoE_{ine}$.

Figure 5:
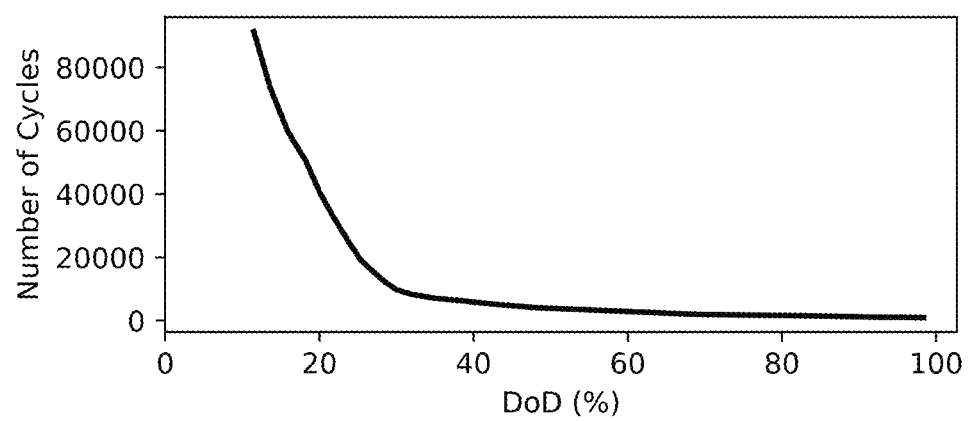
FIG. 5 illustrates a graph showing a relationship between depth of discharge (DoD) levels and battery lifetime for a lithium-ion (LI) battery, in accordance with an embodiment of the present disclosure.

As illustrated in FIG. 5, each level of DoD has a corresponding number of discharge/charge cycles, thus, the battery storage degradation cost may be formulated by the relationship between both. Given a state of battery at time slot t, i.e., $\rangle SoE(t), SoC(t), DoD(t)\rangle$, the SoE decrease of the battery during this time slot can be measured by:

$$\Delta SoE(t) = \begin{cases} 0, & \text{if } b(t) \leq 0 \\ \dfrac{1 - SoE_{inc}}{h(DoD(t-1) + \Delta DoD(t))}, & \text{if } b(t) > 0 \end{cases}$$

where h(•) maps from an input DoD level to the total number of discharge/charge cycles (exemplified in FIG. 5). $\Delta DoD(t)$ shows an increase in DoD, and can be calculated by:

$$\Delta DoD(t) = \frac{b(t)\Delta t}{\pi}$$

Using the $\Delta SoE(t)$ function described above, the degradation cost of battery storage at each time slot t may be formulated as:

where $\lambda_b$ is a coefficient converting the battery degradation to a monetary cost, with the unit of $\Delta SoE(t)$.

In summary, the total investment cost for each time slot t can be calculated as:

$$C^u(t) = C^{u_s}(t) + C^{u_p}(t) + C^{u_b}(t)$$

Optimization Formulation and Difficulty Analysis

The battery discharging/charging operations is controlled by the controller. Given the state (i.e., X(t)) of the battery storage in time slot t−1, the state in time slot t can be updated by:

$$\chi(t) \leftarrow \begin{cases} SoE(t) &= SoE(t-1) - \Delta SoE(t) \\ SoC(t) &= SoC(t-1) - b(t)\Delta t/\pi \\ DoD(t) &= DoD(t-1) + \Delta DoD(t) \end{cases}$$

For the entire billing cycle T, the optimal battery discharging/charging controlling policy to solve the optimization problem must be found, so as to minimize the total electricity bill during the entire billing cycle, which is defined as follows.

$$\min_{b(t)} \sum_{t=1}^{T} (C^e(t) + C^d(t) + C^u(t))$$

s.t. (9), (11), (12), and (25), $\forall t \in \mathcal{T}$

When solving the above optimization problems, however, the following challenges must be addressed.

Uncertainty of Renewable Energy

Renewable energy generation is affected by multiple factors such as outdoor temperature and wind velocity. It is difficult to accurately forecast renewable energy generation (i.e., g(t)) and make the optimal discharging/charging operations (i.e., b(t)) of the battery storage without accurate information in advance, due to the unpredictable and intermittent nature of these factors.

Dynamic of Power Demand

In the aforementioned modeled problem, the power demand (i.e. p(t)) is assumed to be known in advance and thus can essentially be optimized in an offline way. However, such assumptions are unrealistic in practice. In fact, traditional offline optimization methods (e.g., dynamic programming [22,23]) typically do not represent the global optimal solution, as the power demand can be obtained only when the workload arrives at the 5G BS. Thus, an online method to deal with the dynamic power demands (i.e., d(t)) and make optimal discharging/charging operations (i.e., b(t)) is in great need.

High Computation Complexity

The optimization problem described above has embedded NP-hard subproblems. Firstly, in every time slot t, the controller needs to search the action space (mainly determined by M), so as to find the optimal discharging/charging operation (i.e., b(t)). For simplicity, in solving the optimization problem, the SoC of battery may be discretized in to M equal-spaced states. However, in a real-world scenario, the state of the battery is continuous, which leads to an enormous searching space. Secondly, during the entire billing cycle (i.e., T), it is challenging for the controller to continuously make the optimal discharging/charging operation.

To address the aforementioned challenges, an online discharging/charging operation controlling method based on deep reinforcement learning (DRL) is described.

A DRL-Based Battery Operation Approach

The recent breakthrough of deep reinforcement learning (DRL) [24] provides a promising technique for enabling effective experience-driven control, which exploits past experience (e.g., historical battery discharging/charging operations) for better decision-making by adapting to the current state of the environment. DRL is particularly suitable for online discharging/charging operation controlling because: i), it is capable of handling a high-dimensional state space (such as AlphaGo [25]), which is more advantageous over traditional Reinforcement Learning (RL) [26], and ii) it is able to deal with highly dynamic time-variant environments such as time-varying power demand and renewable energy generation. The basic components and concepts of DRL and the proposed DRL-based battery discharging/charging controlling policy are described in detail below.

Components & Concepts

A typical DRL framework consists of five key components: agent, state, action, policy, and reward. The concept and design of each component in the DRL-based battery discharging/charging controlling policy of the present disclosure is explained as follows.

Agent: The role of the agent is to make decisions in every episode by interacting with the environment. Specifically, at the beginning of each time slot, it determines the discharging/charging operations (i.e., b(t)) according the current state (e.g., d(t), g(t), and X(t)) of the environment. The objective is to find an optimal battery discharging/charging controlling policy to minimize the total electricity bill during the entire billing cycle.

State: At each episode, the agent first observes the state of the current environment to take action. In order to take the optimal action at each episode, the current state should cover as much information as possible. The state vector of the current environment as may be defined as s(t)=[d(t), g(t), X(t), $p_{max}$], including current information on power demand, renewable energy generation, battery storage and peak power consumption.

Action: After observing the state of the environment, the agent will take an action accordingly. In the present embodiment, the action is to control the battery discharging/charging operations in each time slot. Specifically, i) whether the battery should be discharged or charged, and ii) how much energy should be discharged or charged. The action taken at time t is denoted by a(t), which is equivalent to b(t).

Policy: The battery discharging/charging controlling policy $\psi(s(t): S \to A$ defines the mapping relationship from the state space to the action space, where S and A represent the state space and the action space, respectively. Specifically, the controlling policy can be represented by set of $a(t)=\psi(s(t))$, which maps the state of the environment to the action at time slot t.

Reward: After interacting with the environment, the agent will receive a reward r(t) (calculated by the reward function R(s(t), a(t))), which indicates the effect of the action in this episode, so as to update the controlling policy. The objective of the agent is to find a policy $\psi$ to maximize the total reward through continuous interaction with the environment. The design of the reward function significantly affects the performance of the DRL-based algorithm, and will be further described below.

At each episode, the agent observes the state s(t), takes an action a(t) generated by the policy iv, and receives a reward r(t) calculated by the reward function R(s(t), a(t)). The objective of the proposed DRL-based battery discharging/charging controlling policy is to take the optimal action in every episode so as to maximize the total reward.

Reward Function Design

At the end of each time slot, the agent evaluates the performance of the action using a reward function, which transforms the performance statistics to a numerical utility value. For an arbitrary time t, the agent observes the state s(t), takes the action a(t) and adopts the following reward function to access the performance of the controlling action:

$$R(s(t),a(t))=\exp(V^e(t)+V^d(t)+V^u(t))$$

In which:

$V^e(t)=-C^e(t)$ measures the reward of the incremental energy charge caused by the action in time slot t;

$V^d(t)=-C^d(t)$ measures the reward of the incremental demand charge caused by the action in time slot t; and $V^u(t)=-C^u(t)$ measures the reward of the investment cost caused by the action in time slot t.

At the end of each time slot, the agent evaluates the performance of the action by the reward r(t) calculated by the reward function R(s(t), a(t)). In the DRL-based framework, the objective is to maximize the expected cumulative discounted reward:

$$r(t) = \mathbb{E}\left[\sum_{k=t}^{\infty}\gamma^k R(s(t), a(t))\right]$$

where $\gamma \in (0,1]$ is a factor discounting future rewards.

Learning Process Design

The learning process of the algorithm adopts a deep neural network (DNN) called Deep Q-Network (DQN) to derive the correlation between each state-action pair (s(t), a(t)) and its value function Q(s(t), a(t)), which is the expected discounted cumulative reward. If the environment is in state s(t) and follows action a(t), the value function of the state-action (s(t), a(t)) can be represented as:

$$Q(s(t),a(t))= \mathbb{E}[r(t)|s(t),a(t)]$$

After obtaining the value of each state-action (s(t), a(t)), the agent selects the action a(t) with the $\epsilon$-greedy policy $\psi$. In other words, the agent randomly selects the action with the probability of $\epsilon$, and chooses the action with the maximum of Q(s(t), a(t)) with the probability of 1-$\epsilon$, i.e., $\text{argmax}_{a(t)}Q(s(t), a(t))$.

Figure 4:
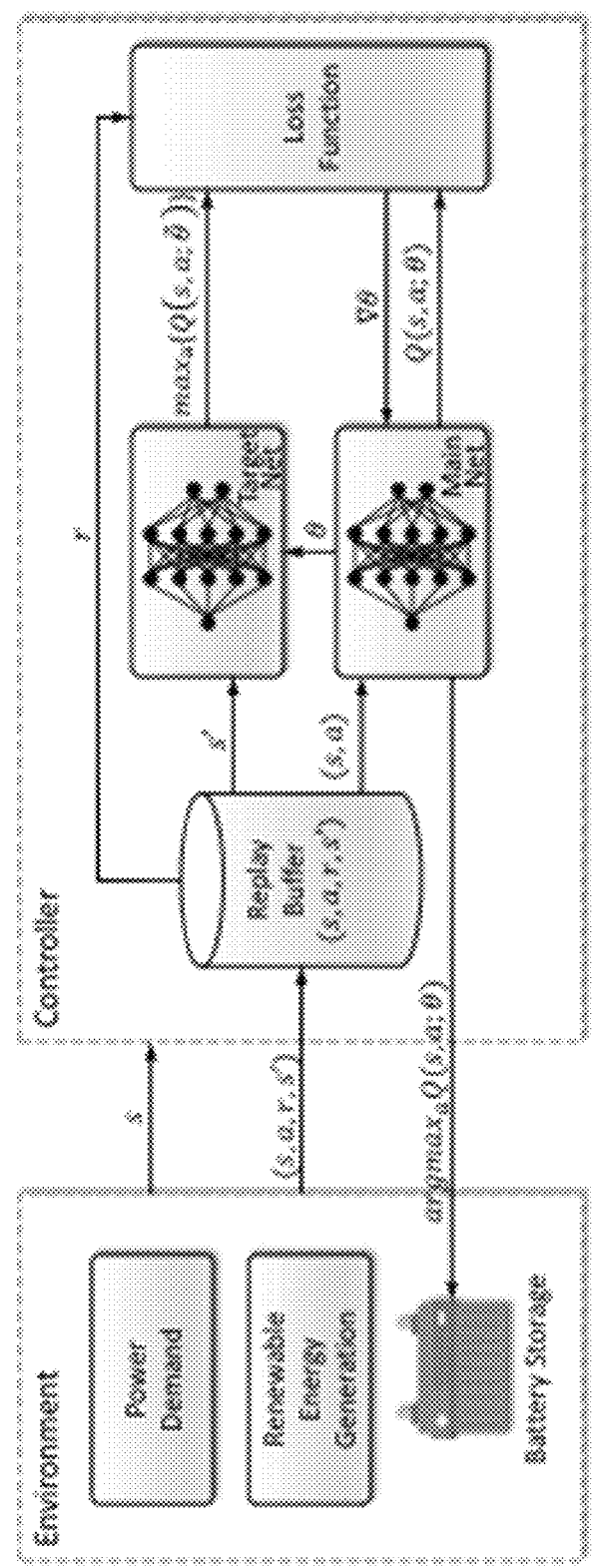
FIG. 4 illustrates a learning process of a Deep Q-Network (DQN), in accordance with an embodiment of the present disclosure.

As illustrated in FIG. 4, two effective techniques were introduced to improve stability: replay buffer and target network. Specifically, Replay Buffer: Unlike traditional reinforcement learning, DQN applies a replay buffer to store state transition samples in the form of $\langle s(t), a(t), r(t), s(t+1) \rangle$ collected during learning. Every $\kappa$ time steps, the DRL-based agent updates the DNN with mini-batch experiences from the replay buffer by means of stochastic gradient descent (SGD): $\theta_{i+1}=\theta_i+ \sigma\Delta_\theta\text{Loss}(\theta)$, where $\sigma$ is the learning rate. Compared with Q-learning (only using immediately collected samples), randomly sampling from the replay buffer allows the DRL-based agent to break the correlation between sequentially generated samples and learn from a more independently and identically distributed past experiences. Thus, the replay buffer can smooth out learning and avoid oscillations or divergence.

Target Network: There are two neural networks with the same structure but different parameters in DQN, the main net and the target net. $Q(s,a;\theta)$ and $Q(s,a;\tilde{\theta})$ represent the current Q-value and target Q-value generated by the main net and the target net, respectively. The DRL-based agent uses the target net to estimate the target Q-value $\tilde{Q}$ for training the DQN. Every $\tau$ time steps, the target net copies the parameters from the main net, whose parameters are updated in real-time. After introducing the target net, the target Q-value will remain unchanged for a period time, which reduces the correlation between the current Q-value and the target Q-value and improves the stability of the algorithm.

Accordingly, the DQN can be trained by the loss function:

$$\text{Loss}(\theta) \leftarrow \mathbb{E}[(\tilde{Q}-Q(s(t),a(t);\theta))^2]$$

where $\theta$ is the network parameters of the main net, and $\tilde{Q}$ is the target Q-value and calculated by:

$$\tilde{Q} \leftarrow r(t)+\gamma\max_{a(t+1)}Q(s(t+1),a(t+1);\tilde{\theta})$$

where $\tilde{\theta}$ is the network parameters of the target net and it updates every $\tau$ time slots by coping from the main net.

| Algorithm 1 |
| --- |
| Algorithm 1: Battery Controlling Algorithm with DRL |

|   | Input: Power demand of BS d(t) and renewable energy generation g(t), 1 ≤ t ≤ T |
|---|---|
|   | Output: Discharging/charging actions a(t), 1 ≤ t ≤ T |
| 1 | Initialize replay buffer (RB) to capacity N; |
| 2 | Initialize main net Q with random weights θ; |
| 3 | Initialize target net $\tilde{Q}$ with weights $\tilde{\theta}$ = θ; |
| 4 | for episode = 1 : MaxLoop do |
| 5 |   for t = 1 : T do |
| 6 |     Get environment state s(t) ; |
| 7 |     $a(t) = \begin{cases} \text{argmax}_a Q(s(t), a(t); \theta), & \text{prob. } \epsilon \\ \text{random action}, & \text{prob. } 1 - \epsilon \end{cases}$ |
| 8 |     Execute action a(t) and receive r(t) and s(t + 1); |
| 9 |     Store <(s(t), a(t), r(t), s(t + 1)> into RB; |
| 10 |     Randomly sample a mini-batch of experience <s(i), a(i), r(i), s(i + 1)> from RB by every $\kappa$ steps: |
| 11 |     $\tilde{Q} = \begin{cases} r(t), & \text{terminates at step } t + 1 \\ r(t) + \gamma\max_{a(t+1)}\{Q(s, (t+1), a(t+1); \tilde{\theta})\}, & \text{else} \end{cases}$ |
| 12 |     Perform SGD on $(\tilde{Q} - Q(s, a; \theta))^2$ w.r.t. θ; |
| 13 |     Set $\tilde{Q}$ = Q by every $\tau$ steps; |
| 14 |   end |
| 15 | end |

In summary, the learning process is depicted by the pseudo-code in Alg.1. The controller first initializes the replay buffer and the parameters (i.e., θ and $\tilde{\theta}$) of the main net and target net, respectively. After obtaining the value of each state-action (s(t), a(t)), the agent selects the action a(t) with the $\epsilon$-greedy policy $\psi$, and then performs the action a(t) and interacts with the environment. Next, the agent will receive the reward r(t) and observe the next state s(t+1) of the environment, meanwhile store the state $\langle$ s(t), a(t), r(t), s(t+1)$\rangle$ into the RB. Every $\kappa$ time steps, the agent updates the DNN by the loss function with a mini-batch experience from the replay buffer by means of stochastic gradient descent (SGD). The target net will copy the parameters of the main net by every $\tau$ time steps. During the learning process, the learning rate $\sigma$ is set as 0.001, the $\epsilon$ in $\epsilon$-greedy method is 0.9, the discount accumulative factor $\gamma$ is 0.9, and the step parameters $\tau$ and $\kappa$ are both 2000.

Performance Evaluation

The performance of the proposed DRL-based battery discharging/charging controlling policy is evaluated through extensive numerical analysis.

Experiment Setup

BS and Power Consumption Data

In order to show the performance of the proposed method, the 5G BS deployed at the three areas are considered, i.e., resident area, office area, and comprehensive area, whose power consumption within one-week period are illustrated in FIG. 2, and the power consumption of the same type BSs in different cities (e.g., Beijing, Shanghai and Guangzhou) is assumed to be the same. For simplicity, the BS deployed at the areas of resident, office, and comprehensive as are denoted as type I, type II, and type III, respectively. The BESS aided renewable energy supply solution shall be applied to different types of BSs in different cities under different weather conditions and evaluate its performance through massive simulation experiment.

Renewable Energy Generation Data

Figure 6A:
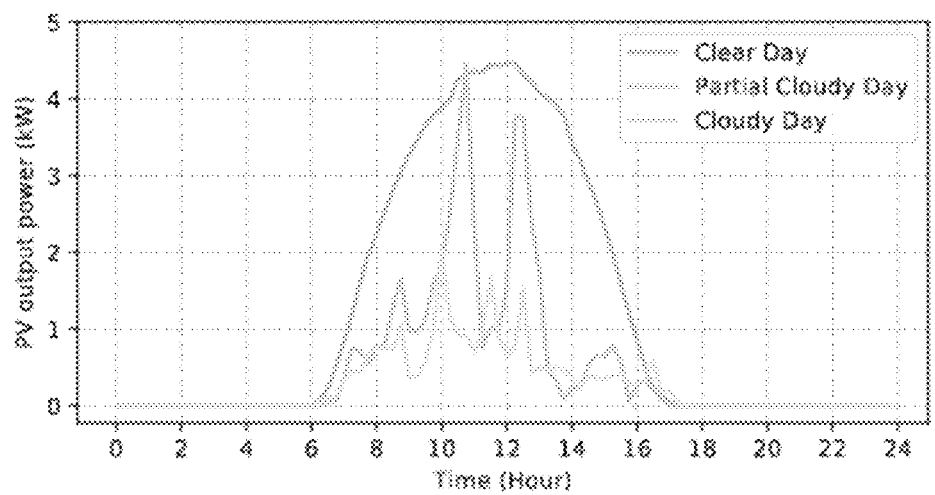
Figure 6B:
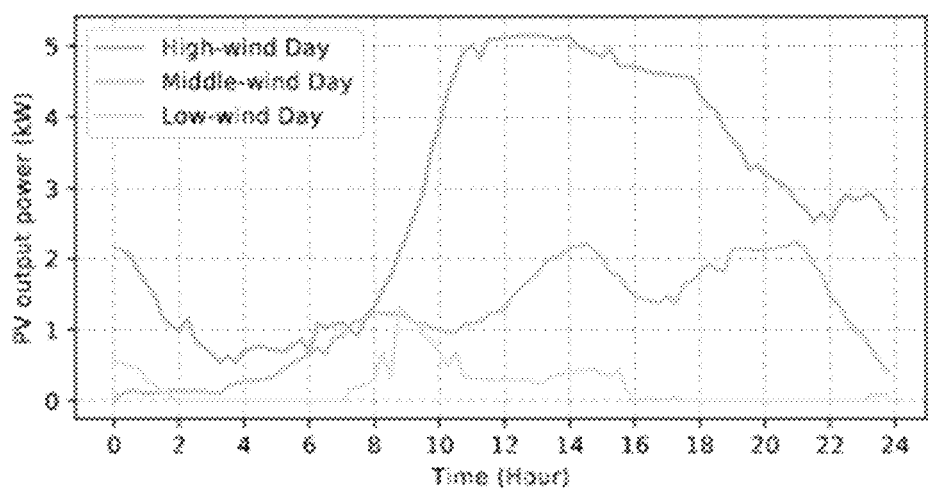

The factors that impact the generation of renewable energy are introduced herein. For simplicity, the weather conditions are divided into three types. The output power pattern of the solar PV and wind turbine could also be divided into three types. Specifically, for the solar PV, the weather conditions are divided into clear day, partial cloudy day, and cloudy day; for the wind turbine, the weather conditions are divided into high wind velocity, middle wind velocity, and low wind velocity. The output power patterns of the solar PV and wind turbine under different weather conditions are illustrated in FIGS. 6A-6B.

Equipment Parameter Settings

A quantity of 15 Panasonic Sc330 solar modules each with a power rating of 330W and JFNH-5 kW wind turbine of Qingdao Jinfan Energy Science and Technology Co., Ltd. Are utilized. For battery storage, the mainstream lithium-ion (LI) battery on the current market is considered. it can be referred to [15, 27, 6] for parameter settings of electricity billing policy and battery configurations and the main parameter settings are summarized in Table II.

TABLE II

| | Parameter | Setting |
|---|---|---|
| Billing Policy | billing cycle window W | one month (30 days) |
| | $^1$energy charge price $\lambda_c$ | US$0.049/kWh |
| | $^1$demand charge price $\lambda_d$ | US$16.08/kW |
| | $^2$battery cost $\lambda_b$ | US$271/kWh |
| Battery Config. | discharge efficiency α | 85% |
| | charge efficiency β | 99.9% |
| | max charge rate R+ | 16 MW |
| | max discharge rate R− | 8 MW |
| Solar PV | power rating $g^s$ | 4950 W |
| | price $\lambda_s$ | US$3950 |
| | lifetime $L^s$ | 25 years |

TABLE II-continued

| | Parameter | Setting |
|---|---|---|
| Wind Turbine | power rating $g^w$ | 6000 W |
| | price $\lambda_w$ | US$4500 |
| | lifetime $L^w$ | 20 years |

Scenario Settings

Figure 7:
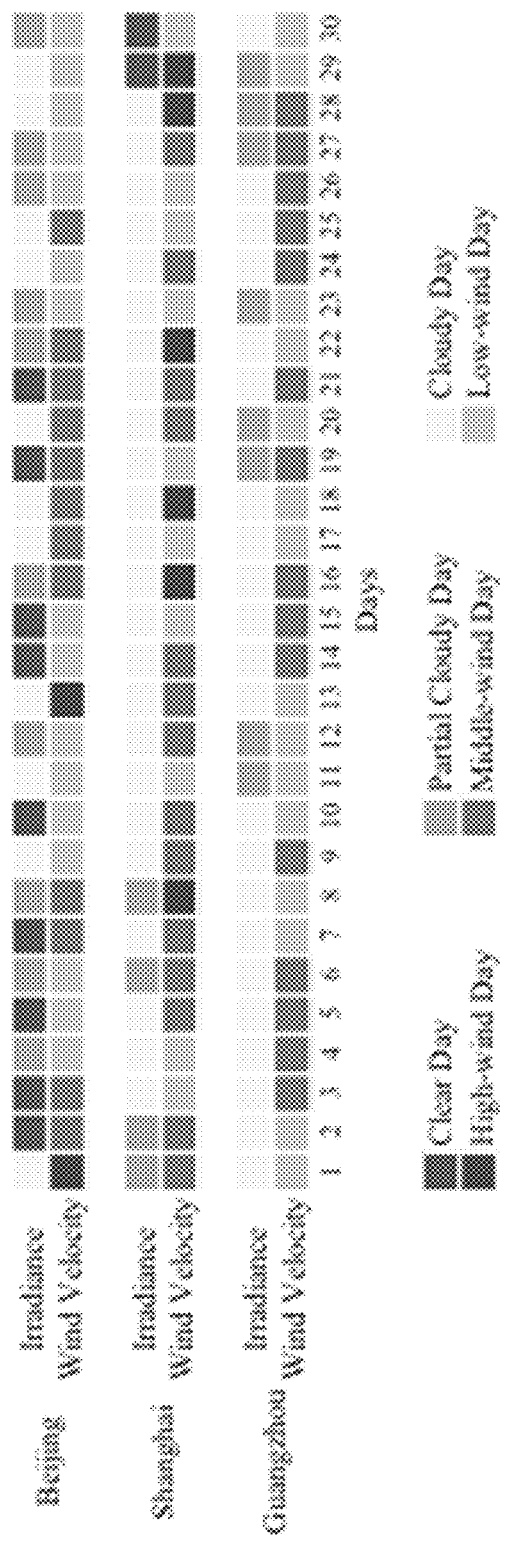
FIG. 7 illustrates a graph showing weather data in different cities, in accordance with an embodiment of the present disclosure.
Figure 8A:
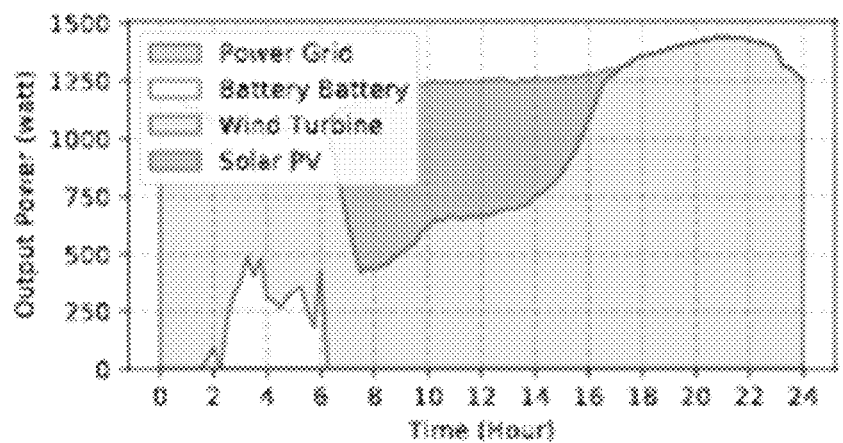
FIGS. 8A-8I illustrate graphs showing power supply patterns of different power supply methods under different weather conditions, in accordance with an embodiment of the present disclosure.
Figure 8B:
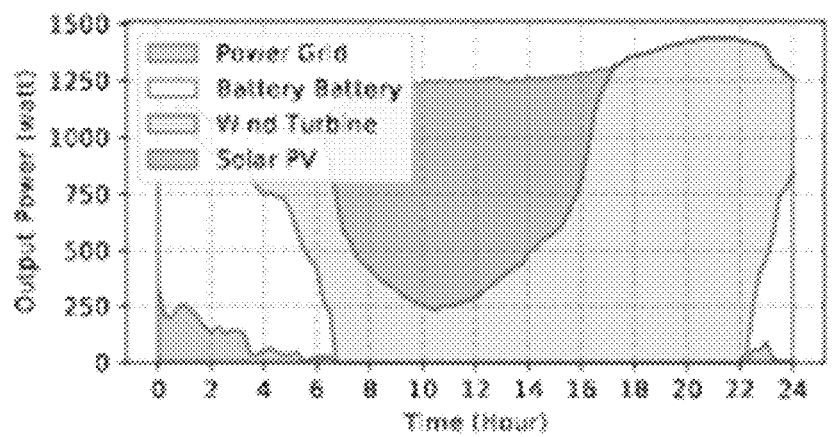
Figure 8C:
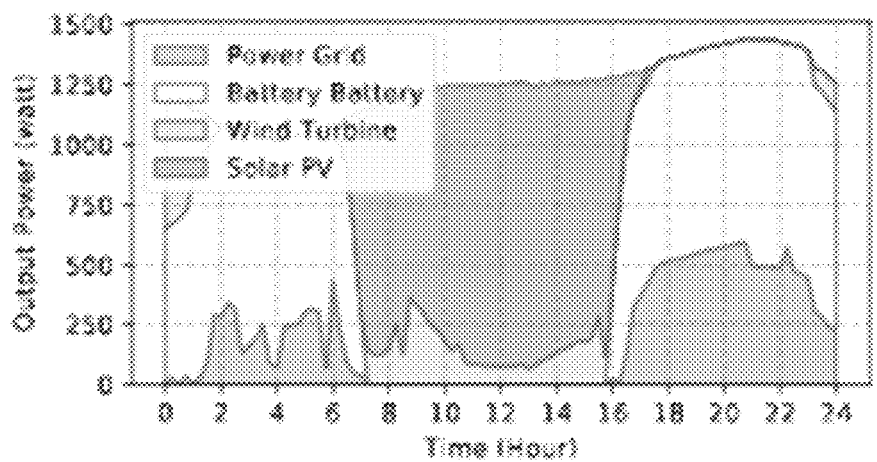
Figure 8D:
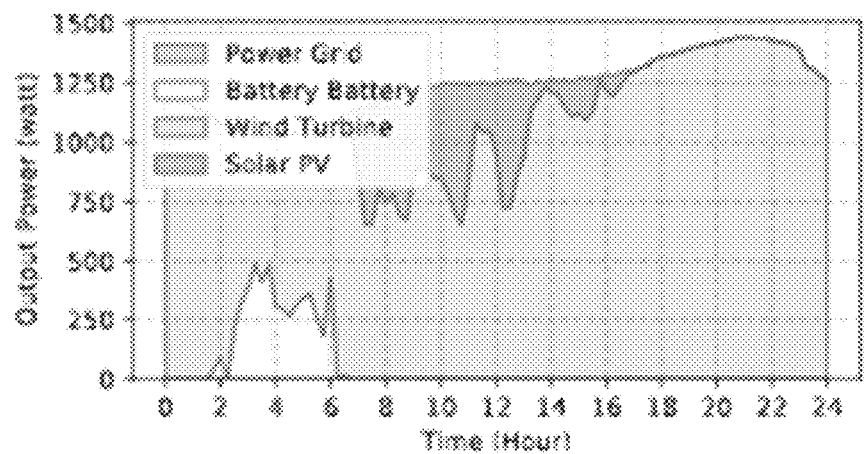
Figure 8E:
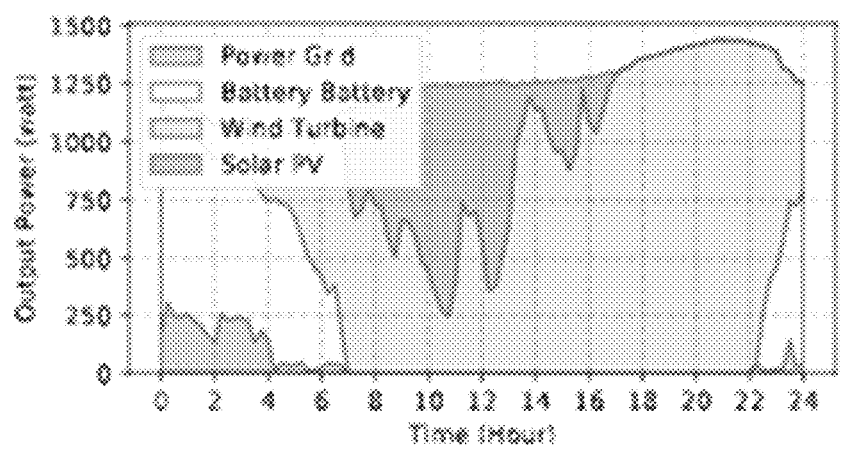
Figure 8F:
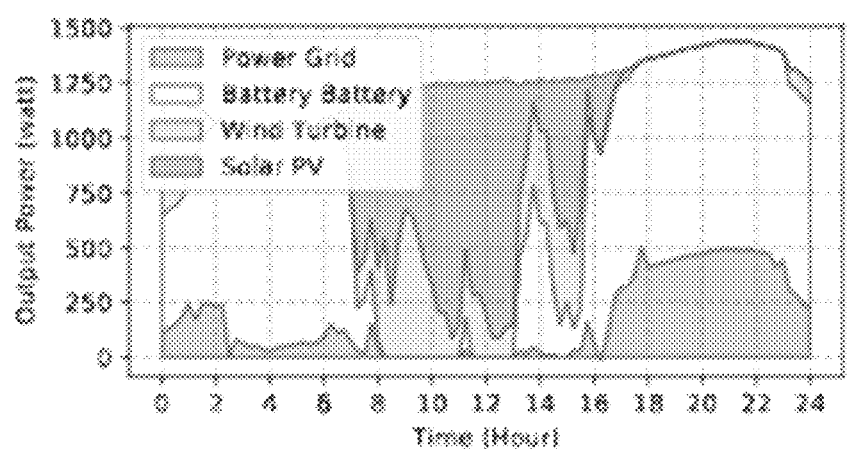
Figure 8G:
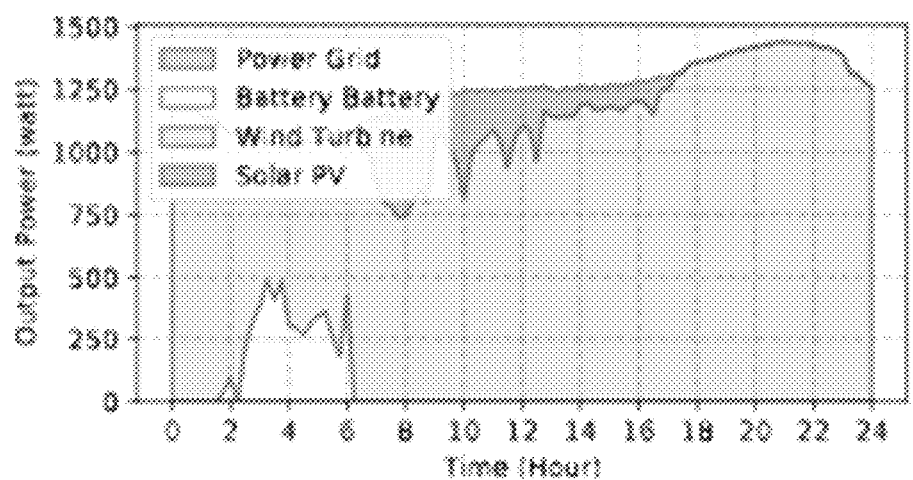
Figure 8H:
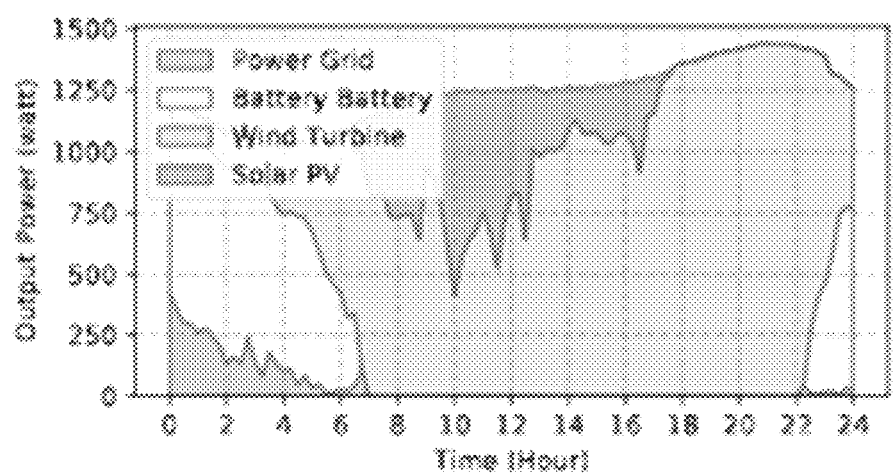
Figure 8I:
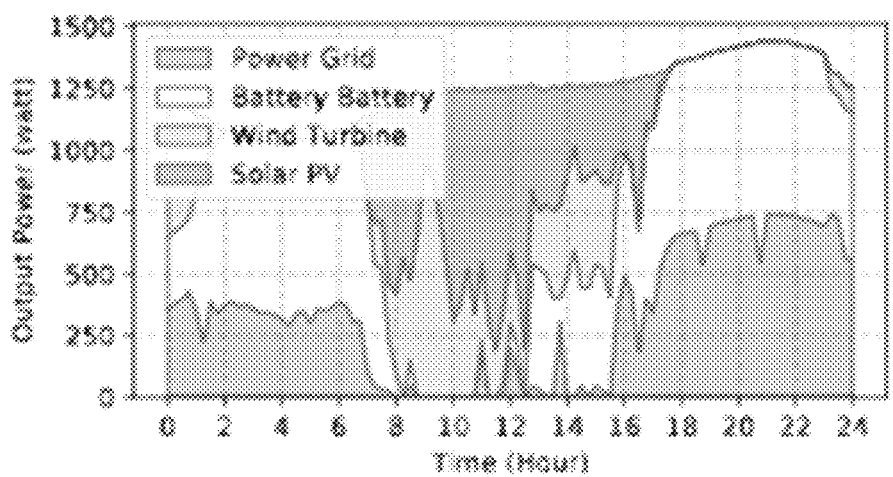

As the generation of renewable energy is significantly affected by the weather conditions, three representative cities in China are selected, i.e., Beijing, Shanghai, and Guangzhou, which have different weather pattern during the billing cycle window (i.e., from 1 Jun. 2020 to 30 Jun. 2020). the overall energy cost (including energy charge, demand charge and investment cost), detailed controlling results and return of investment (ROI) for three types of BSs (i.e., type I, type II, and type III BSs) are compared and analyzed in these cities, and the specific day of the weather conditions in these cities during the billing cycle window are shown in FIG. 7. Specifically, i) for Beijing, it has more clear days during the billing cycle window, ii) for Shanghai, it is in the plum rain season during the billing cycle window, thus it has more high-wind days but less clear days, and iii) for Guangzhou, the cloudy days and the low-wind days are relatively more than other two cities.

Performance Under Different Weather Conditions

As is shown in FIGS. 6A-6B, the output power patterns of the solar PV and wind turbine are both divided into three types under different weather conditions. Accordingly, the weather pattern can be divided into nine types: clear & high-wind day, clear & middle-wind day, clear & low-wind day, partial cloudy & high-wind day, partial cloudy & middle-wind day, partial cloudy & low-wind day, cloudy & high-wind day, cloudy & middle-wind day, and cloudy & low-wind day.

The power supply patterns under different weather conditions in one day period of 5G BS are illustrated in FIGS. 8A-8I. As it can be seen, the BESS aided renewable energy supply solution could significantly reduce the power from the grid (i.e., energy charge and demand charge). Specifically, with the increase of radiation and wind velocity, renewable energy generation increased accordingly. It could cover most of the power demand and reduce the power supplied from the power grid. Especially, under high-wind days, the power demand could be totally supplied by the renewable energy and battery storage and need no power from the grid.

After the power supply paradigm under different weather patterns is calculated, the electricity bill of these three types of BSs during the billing cycle in different cities (i.e., different weather patterns, which is illustrated in FIG. 7) can be driven and the results from all the set scenarios are summarized in Table III.

TABLE III

| BS Type | Scenerio | Energy Charge ($) | Demand Charge ($) | Investment Cost ($) | Cost Saving ($) | Saving Ratio ($) |
|---|---|---|---|---|---|---|
| Type I | No deployment | 44.6 | 23.1 | 0 | / | / |
| | Deployment in Bejing | 5.0 | 12.0 | 0.4 | 50.4 | 74.4 |
| | Deployment in Shanghai | 4.7 | 12.0 | 0.4 | 50.7 | 74.8 |
| | Deployment in Guangzhou | 5.9 | 12.0 | 0.3 | 49.5 | 73.2 |
| Type II | No deployment | 40.1 | 30.2 | 0 | / | / |
| | Deployment in Bejing | 4.8 | 9.1 | 0.3 | 46.1 | 76.4 |
| | Deployment in Shanghai | 3.8 | 9.1 | 0.4 | 47.0 | 77.9 |
| | Deployment in Guangzhou | 5.3 | 9.1 | 0.3 | 45.6 | 75.6 |

TABLE III-continued

| BS Type | Scenerio | Energy Charge ($) | Demand Charge ($) | Investment Cost ($) | Cost Saving ($) | Saving Ratio ($) |
|---|---|---|---|---|---|---|
| Type III | No deployment | 45.6 | 22.8 | 0 | / | / |
| | Deployment in Bejing | 6.8 | 13.9 | 0.3 | 47.4 | 69.3 |
| | Deployment in Shanghai | 5.7 | 13.9 | 0.4 | 48.4 | 70.8 |
| | Deployment in Guangzhou | 7.9 | 13.9 | 0.2 | 46.4 | 67.8 |

Specifically, for a single 5G BS without the proposed power supply paradigm, the energy charge and the demand charge are $45.6 and $22.8, respectively. However, after utilizing the BESS aided renewable energy supply solution on the 5G BSs, the electricity bill is significantly reduced. Especially in Shanghai, which has relatively more clear and high-wind days, the energy charge and the demand charge can be reduced to $3.8 and $9.1, respectively. Although there exists equipment degradation during the discharge/charge cycles, the investment cost is maintained at an acceptable level. The highest cost saving for the BS which utilized the proposed power supply paradigm in Beijing, Shanghai, and Guangzhou in one billing cycle is $50.4, $50.7, and $49.5, respectively. Accordingly, the saving ratio can be up to 74.4%, 74.8%, and 73.2%, respectively.

Performance Under Different Types of BSs

As the different types of BSs have diverse power demands, resulting in different energy charges and demand charges, the performance of the BESS aided renewable energy supply solution may be different.

Specifically, as is shown in Table III, the type I BS has the highest cost savings compared to other two types of BSs, i.e., $50.4 in Beijing, $50.7, and $49.5. The type I BS has the biggest power demand and peak value (near 1450 watt), and as such has greater potential in energy-saving and peak power shaving. As type II BS's power demands are relatively small, the generated and stored renewable energy can effectively reduce the power grid supply. Therefore, it has the highest saving ratio, i.e., 76.4% in Beijing, 77.9% in Shanghai, and 75.6% in Guangzhou.

ROIs of Different City and Type Deployment

The return of investment (ROI) is a financial metric defined by the benefit (cost saving in the case of the present disclosure) divided by the total investment. It indicates the probability of gaining a return from an investment and has been widely used to evaluate the efficiency of an investment [20]. Typically, a bigger ROI value indicates a higher investment efficiency. With the costs of renewable energy generator and battery storage (given in Table II), the total investments can be calculated. Accordingly, the ROIs can thus be derived with the results in Table. III.

The ROIs of different types of BSs deployed in different cities are shown in Table IV. Specifically, type I BSs have the highest ROI, reaching 5.43% in Beijing, 5.46% in Shanghai, and 5.33% in Guangzhou, respectively, indicating a relatively high investment efficiency for the operators. This is because that type I BS has the biggest cost saving potential.

TABLE IV

| BS Type | Beijing | Shanghai | Guangzhou |
|---|---|---|---|
| Type I | 5.43% | 5.46% | 5.33% |
| Type II | 4.97% | 5.06% | 4.91% |
| Type III | 5.11% | 5.21% | 5.00% |

As the equipment's cost is estimated to decrease dramatically in the future [21], the ROI could rise significantly in 5G scenarios and beyond. Additionally, the city with more clear and high-wind days will obtain a bigger ROI value, thus the proposed solution is more suitable for those cities with more sunny and windy days.

It is worth noting that, the deployed renewable energy generator and the battery storage are assumed to supply power to a single 5G BS, and thus the surplus renewable energy (when the battery is full) will be discarded. This can lead to a relatively low utilization. In practice, the generated renewable energy could supply to multiple BSs [7], so that the ROI and utilization of the renewable energy could be further improved.

To cope with the ever-increasing electricity bill for mobile operators in 5G era, a BESS aided renewable energy supply solution for the 5G BS system is disclosed herein, which models the battery discharging/charging controlling as an optimization problem. With the proposed solution, a BS can be powered by renewable energy and the battery storage alongside the power grid to reduce total energy costs. To solve the problem under the dynamic power demands and renewable energy generation, developed a DRL-based approach is utilized with the BESS operation that accommodates for many factors in the modeling phase and makes decisions in real-time. To evaluate the performance of the present solution, three cities with different weather patterns were chosen for experiments. The experimental results show that the solution of the present disclosure can significantly reduce the electricity bill and improve the renewable energy utilization.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the said teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the said-described embodiments, but instead is defined by the appended claims considering their full scope of equivalents.

REFERENCE LIST

[1] J. G. Andrews, S. Buzzi, W. Choi, S. V. Hanly, A. Lozano, A. C. Soong, and J. C. Zhang, "What will 5g be?" IEEE Journal on selected areas in communications, vol. 32, no. 6, pp. 1065-1082, 2014.

[2] M. Gerla, E.-K. Lee, G. Pau, and U. Lee, "Internet of vehicles: From intelligent grid to autonomous cars and vehicular clouds," in 2014 IEEE world forum on internet of things (WF-IoT). IEEE, 2014, pp. 241-246.

[3] N. Kumar, S. Misra, J. J. Rodrigues, and M. S. Obaidat, "Coalition games for spatio-temporal big data in internet of vehicles environment: A comparative analysis," IEEE Internet of Things Journal, vol. 2, no. 4, pp. 310-320, 2015.

[4] G. C. Burdea and P. Coiffet, Virtual reality technology. John Wiley & Sons, 2003.

[5] E. D. Muse, P. M. Barrett, S. R. Steinhubl, and E. J. Topol, "Towards a smart medical home," The Lancet, vol. 389, no. 10067, p. 358, 2017.

[6] US Department of Energy, "Energy storage technology and cost characterization report," https://www.energy.gov/eere/water/downloads/energy-storage-technology-and-cost-characterization-report, 2019.

[7] G. Tang, Y. Wang, and H. Lu, "Shift guard: Towards reliable 5g network by optimal backup power allocation," in IEEE SmartGridComm, 2020, pp. 1-6.

[8] R. Fu, D. Feldman, R. Margolis, M. Woodhouse, and K. Ardani, "Us solar photovoltaic system cost benchmark: Q1 2017," EERE Publication and Product Library, Tech. Rep., 2017.

[9] J. A. Turner, "A realizable renewable energy future," Science, vol. 285, no. 5428, pp. 687-689, 1999.

[10] X. Wang, A. V. Vasilakos, M. Chen, Y. Liu, and T. T. Kwon, "A survey of green mobile networks: Opportunities and challenges," Mobile Networks and Applications, vol. 17, no. 1, pp. 4-20, 2012.

[11] B. Nykvist and M. Nilsson, "Rapidly falling costs of battery packs for electric vehicles," Nature climate change, vol. 5, no. 4, pp. 329-332, 2015.

[12] A. Mondal, S. Misra, and M. S. Obaidat, "Distributed home energy management system with storage in smart grid using game theory," IEEE Systems Journal, vol. 11, no. 3, pp. 1857-1866, 2015.

[13] H. Wang, F. Xu, Y. Li, P. Zhang, and D. Jin, "Understanding mobile traffic patterns of large-scale cellular towers in urban environment," in Proceedings of the 2015 Internet Measurement Conference, 2015, pp. 225-238.

[14] H. Xu and B. Li, "Reducing electricity demand charge for data centers with partial execution," in Proceedings of the 5th international conference on Future energy systems, 2014, pp. 51-61.

[15] M. Dabbagh, B. Hamdaoui, A. Rayes, and M. Guizani, "Shaving data center power demand peaks through energy storage and workload shifting control," IEEE Transactions on Cloud Computing, 2017.

[16] China Meteorological Administration, "Historical weather forecast," http://www.weather.com.cn/, 2019.

[17] W. F. Holmgren, R. W. Andrews, A. T. Lorenzo, and J. S. Stein, "Pvlib python 2015," in 2015 ieee 42nd photovoltaic specialist conference (pvsc). IEEE, 2015, pp. 1-5.

[18] A. Jahid, M. S. Hossain, M. K. H. Monju, M. F. Rahman, and M. F. Hossain, "Techno-economic and energy efficiency analysis of optimal power supply solutions for green cellular base stations," IEEE Access, vol. 8, pp. 43 776-43 795, 2020.

[19] B. Qi, M. Rashedi, and O. Ardakanian, "Energy boost: Learning-based control of home batteries," in Proceedings of the Tenth ACM International Conference on Future Energy Systems, 2019, pp. 239-250.

[20] Wikipedia, "Return on investment," https://en.wikipedia.org/wiki/Returnoninvestment, 2020.

[21] National Renewable Energy Laboratory (NREL), "Cost projections for utility-scale battery storage," https://www.nrel.gov/docs/fy19osti/73222.pdf, 2019.

[22] D. K. Maly and K.-S. Kwan, "Optimal battery energy storage system (bess) charge scheduling with dynamic programming," IEE Proceedings-Science, Measurement and Technology, vol. 142, no. 6, pp. 453-458, 1995.

[23] A. Oudalov, R. Cherkaoui, and A. Beguin, "Sizing and optimal operation of battery energy storage system for peak shaving application," in 2007 IEEE Lausanne Power Tech. IEEE, 2007, pp. 621-625.

[24] V. Mnih, K. Kavukcuoglu, D. Silver, A. A. Rusu, J. Veness, M. G. Bellemare, A. Graves, M. Riedmiller, A. K. Fidjeland, G. Ostrovskiet al., "Human-level control through deep reinforcement learning," nature, vol. 518, no. 7540, pp. 529-533, 2015.

[25] D. Silver, A. Huang, C. J. Maddison, A. Guez, L. Sifre, G. Van Den Driessche, J. Schrittwieser, I. Antonoglou, V. Panneershelvam, M. Lanctotet al., "Mastering the game of go with deep neural networks and tree search," nature, vol. 529, no. 7587, pp. 484-489, 2016.

[26] R. S. Sutton and A. G. Barto, Reinforcement learning: An introduction. MIT press, 2018.

[27] Dominion Energy South Carolina, Inc., "Rate 23—industrial power service," https://etariff.psc.sc.gov/Organization/TariffDetail/150?OrgId=411, 2020.

What is claimed is:

1. A battery energy storage system (BESS) comprising:
a battery storage configured to store surplus renewable energy;
a controller coupled to the battery storage and configured to control charging operations and discharging operations of the battery storage;
a generation meter coupled to the controller and configured to measure renewable energy;
a renewable energy generator coupled to the generation meter and configured to generate renewable energy; and
a standard meter coupled to the controller and configured to measure energy provided by a power grid;
wherein the controller is configured to manage energy expenditure of the BESS according to the following steps:
initializing a replay buffer configured to store state transition samples;
initializing a main net configured to generate a current Q-value;
initializing a target net configured to generate a target Q-value;
obtaining an environment state of the BESS;
selecting an action based on an $\epsilon$-greedy policy, wherein the action controls battery discharging and battery charging operations of the BESS;
executing the action resulting in a next environment state and calculating a reward based on the performance of the action;
storing transition samples in the replay buffer, the transition samples comprising the environment state, the action, the reward, and the next environment state;
periodically updating a Deep Neural Network (DNN) by a loss function with a mini-batch experience from the replay buffer;
updating the target net based on the reward; and
periodically updating parameters of the target net with parameters of the main net,
wherein the DNN comprises the main net and the target net;
wherein the reward is calculated based on a reward function and the reward function comprises a reward for incremental energy charge, a reward for incremental demand charge, and a reward for an investment cost; and wherein the investment cost comprises a cost of using the battery storage and the renewable energy generator in one cycle.

2. The system of claim 1, wherein the incremental energy charge comprises a total consumed electricity amount of the BESS in one cycle.

3. The system of claim 1, wherein the incremental demand charge comprises a peak power demand of the BESS in one cycle.

4. The system of claim 1, wherein the loss function comprises an expected value of the difference between the target Q value and the current Q value.

5. The system of claim 4, wherein parameters of the main network are updated in real time based on results from the loss function.

6. The system of claim 1, wherein the ϵ-greedy policy comprises:
   selecting an action with a maximum reward from the main net with a probability of ϵ; and
   selecting a random action with a probability of 1-ϵ.

7. The system of claim 1, wherein the DNN is updated by the loss function with a mini-batch experience from the replay buffer by means of stochastic gradient descent.

8. The system of claim 1, wherein the environment state comprises:
   a power demand of the BESS;
   an amount of renewable energy generated by the renewable energy generator;
   a battery storage state; and
   a peak power consumption of the BESS.

9. The system of claim 8, wherein the battery storage state comprises:
   a State of Energy (SoE) comprising a current effective capacity of the battery storage as a percentage of an initial capacity of the battery storage;
   a State of Charge (SoC) comprising a current energy stored in the battery as a percentage of the current effective capacity; and
   a Depth of Discharge (DoD) comprising an amount of energy that has been released by the battery storage as a percentage of the current effective capacity.

10. The system of claim 1, wherein the renewable energy generator comprises a solar photovoltaic (PV) module and a wind turbine.

11. The system of claim 10, wherein the power generated by the solar PV module is calculated based on global horizontal irradiance, outdoor temperature, and time of day.

12. The system of claim 11, wherein the power generated by the wind turbine is calculated based on wind velocity, a weather system, and hub height.

13. The system of claim 1, wherein the action comprises (i) a determination of whether or not the battery storage should be discharged or charged and (ii) a determination of an amount of energy to be discharged or charged.

* * * * *